(12) United States Patent
Hong

(10) Patent No.: US 11,903,039 B2
(45) Date of Patent: Feb. 13, 2024

(54) RANDOM ACCESS METHOD AND RANDOM ACCESS APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 162 days.

(21) Appl. No.: 17/442,103

(22) PCT Filed: Apr. 2, 2019

(86) PCT No.: PCT/CN2019/081014
§ 371 (c)(1),
(2) Date: Sep. 22, 2021

(87) PCT Pub. No.: WO2020/199123
PCT Pub. Date: Oct. 8, 2020

(65) Prior Publication Data
US 2022/0167400 A1  May 26, 2022

(51) Int. Cl.
*H04W 74/00* (2009.01)
*H04W 74/08* (2009.01)
*H04W 80/02* (2009.01)

(52) U.S. Cl.
CPC ....... *H04W 74/085* (2013.01); *H04W 74/008* (2013.01); *H04W 80/02* (2013.01)

(58) Field of Classification Search
CPC . H04W 74/085; H04W 74/008; H04W 80/02; H04W 24/02; H04W 74/0833
See application file for complete search history.

(56) References Cited

U.S. PATENT DOCUMENTS

| | | | |
|---|---|---|---|
| 2018/0317263 A1* | 11/2018 | Ishii | H04W 74/0833 |
| 2019/0335515 A1* | 10/2019 | Chen | H04W 74/0858 |
| 2020/0178318 A1* | 6/2020 | Yu | H04W 74/006 |

FOREIGN PATENT DOCUMENTS

| | | |
|---|---|---|
| CN | 108282901 A | 7/2018 |
| WO | WO 2018066934 A2 | 4/2018 |

(Continued)

OTHER PUBLICATIONS

Huawei et al. ("Discussion on msgB for 2-step RACH", 3GPP Draft; R2-1904113 Discussion on msgB for 2-Step RACH, 3rd Generation Partnership Project (3GPP), Mobile Competence Centre; 650, Route Des Lucioles; F-06921 Sophia-Antipolis Cedex ; France, vol. Ran WG2, No. Xi'an, China; Apr. 8, 2019-Apr. 12, 2019, Mar. 2019.*

(Continued)

*Primary Examiner* — Lakeram Jangbahadur
(74) *Attorney, Agent, or Firm* — COZEN O'CONNOR

(57) ABSTRACT

A random access method, a random access apparatus, an electronic device and a computer-readable storage medium are disclosed. The method includes: initiating random access by transmitting a preamble and an identity to a base station; receiving a message fed back by the base station for the preamble and the identity, in which the message includes at least one information unit, and different information units are configured to indicate different results of initiating random access through the user equipment; and performing an operation corresponding to a result of initiating random access indicated by the information unit in the message.

13 Claims, 6 Drawing Sheets

(56) References Cited

FOREIGN PATENT DOCUMENTS

WO     WO-2019029300 A1 *   2/2019  .......... H04W 72/042
WO     WO 2019029300 A1     2/2019

OTHER PUBLICATIONS

European Patent Application No. 19922935.2 Search and Opinion dated Mar. 11, 2022, 13 pages.
Indian Patent Application No. 202147048942, Office Action dated Apr. 29, 2022, 6 pages.
Huawei et al. "Discussion on msgB for 2-step RACH" 3GGP Draft; Meeting #105bis; R2-1904113; Apr. 2019, 4 pages.
PCT/CN2019/081014 English translation of the International Search Report dated Jan. 7, 2020, 2 pages.

* cited by examiner

RANDOM ACCESS METHOD AND RANDOM ACCESS APPARATUS

CROSS-REFERENCE TO RELATED APPLICATION

This application is national phase of International Application No. PCT/CN2019/081014, filed on Apr. 2, 2019, the entire contents of which are incorporated herein by reference.

TECHNICAL FIELD

The disclosure relates to the field of communication technologies, and in particular to a random access method for initiating a data transfer, a random access apparatus, an electronic device and a computer-readable storage medium.

BACKGROUND

A duration of performing a random access process for initiating a data transfer in the related art is too long, which causes a long delay in establishing a communication connection between user equipment and a base station.

SUMMARY

According to a first aspect of the disclosure, a random access method for user equipment is provided.

The method includes initiating random access by transmitting a preamble and an identity to a base station.

The method further includes receiving a message fed back by the base station for the preamble and the identity, in which the message includes at least one information unit, and different information units are configured to indicate different results of initiating random access through the user equipment.

The method further includes performing an operation corresponding to a result of initiating random access indicated by the information unit in the message.

According to a second aspect of the disclosure, a random access method for a base station is provided.

The method includes receiving a preamble and an identity from user equipment.

The method further includes determining a result of initiating random access through the user equipment based on the preamble and the identity.

The method further includes transmitting a message to the user equipment based on the result, in which the message includes at least one information unit, and different information units are configured to indicate different results of initiating random access through the user equipment.

According to a third aspect of the disclosure, an electronic device is provided.

The electronic device includes a processor.

The electronic device further includes a memory for storing instructions executable by the processor.

The processor is configured to perform the method according to any of the above embodiments.

According to a fourth aspect of the disclosure, a computer-readable storage medium with computer programs stored thereon is provided. When the programs are executed by a processor, the method according to any of the above embodiments is performed.

BRIEF DESCRIPTION OF THE DRAWINGS

In order to clearly illustrate technical solutions of embodiments of the disclosure, a brief description of drawings used in embodiments is given below. Obviously, the drawings in the following descriptions are only part embodiments of the disclosure, and for those skilled in the art, other drawings can be obtained according to these drawings without creative labor.

DETAILED DESCRIPTION

Reference will be made clearly and completely to technical solutions in embodiments of the disclosure with accompanying drawings. Obviously, the embodiments described herein are only part of the embodiments of the disclosure and are not all embodiments of the disclosure. Based on the embodiments of the disclosure, other embodiments obtained by those skilled in the art without creative labor are within scope of the disclosure.

Figure 1:
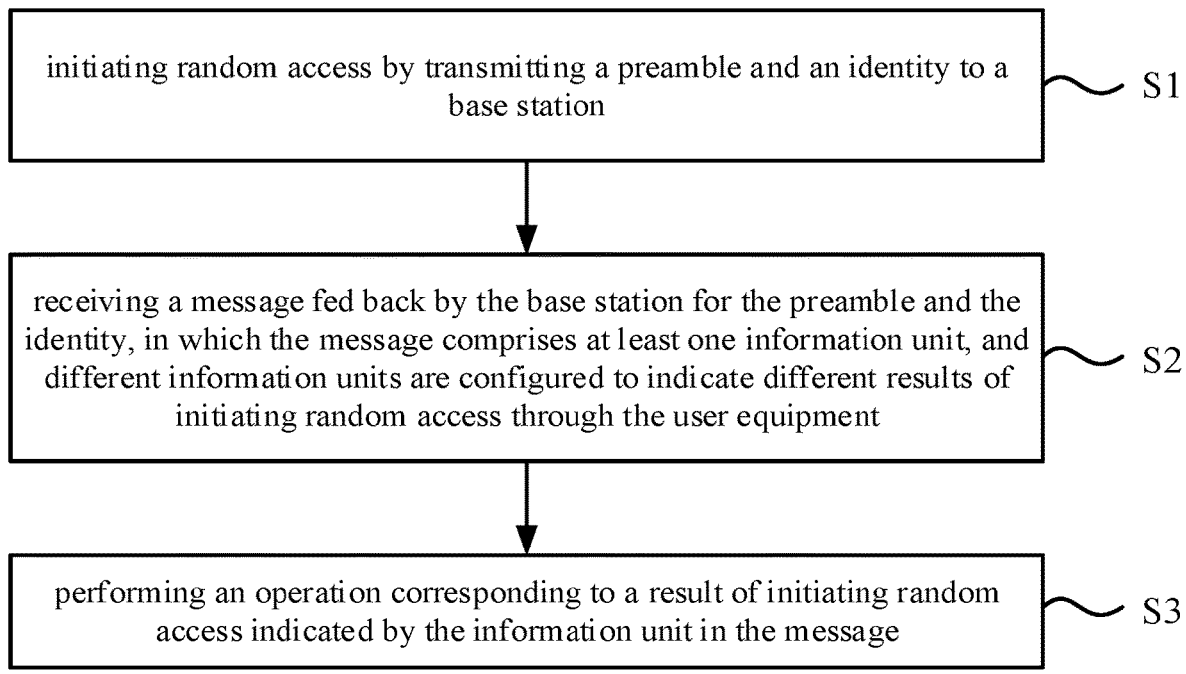
FIG. 1 is a flowchart of a random access method according to embodiments of the disclosure.

FIG. 1 is a flowchart of a random access method according to embodiments of the disclosure. The random access method described in the embodiments of the disclosure is applicable to user equipment. The user equipment may communicate with a base station, for example may communicate with the base station based on 4G (4th-Generation Mobile Communication Technology) or 5G (5th-Generation Mobile Communication Technology) technologies. The user equipment may be a mobile phone, a tablet computer, a wearable device and other electronic devices.

As illustrated in FIG. 1, the random access method includes the following.

In block S1, random access is initiated by transmitting a preamble and an identity to a base station.

In block S2, a message fed back by the base station for the preamble and the identity is received, in which the message includes at least one information unit, and different information units are configured to indicate different results of initiating random access by the user equipment.

In block S3, an operation, corresponding to a result of initiating random access indicated by the information unit in the message, is performed.

In the related art, the random access (the competitive random access) process between the user equipment and the base station includes 4 actions. Firstly, the user equipment transmits the first message MSG1 of the random access to the base station, and the MSG1 mainly includes a preamble. After receiving the MGS1, the base station transmits the second message MSG2 of the random access to the user equipment. The MSG2 may be called a RAR (random access response), which mainly includes a preamble identity and uplink resource allocation information. After the user equipment receives the MSG2, the user equipment transmits the third message MSG3 of the random access to the base station, and the MSG3 mainly includes a user identity of the user equipment. After the base station receives the MSG3, the base station transmits contention resolution (CR) information to the user equipment. The user equipment determines whether the communication connection between the user equipment and the base station is established based on the CR information.

After receiving the preamble and the identity, the base station determines the result(s) of initiating random access through the user equipment based on the preamble and the identity. For example, it is determined whether the received preamble is the same as a preset preamble, and/or whether the received identity is the same as a preset identity, and then a corresponding message is generated based on the result(s) accessed at any time.

In some embodiments, the results accessed at any time may include 4 types.

Firstly, if the random access is successful, i.e., success in competition for the competitive random access, the first information unit is generated and transmitted to the user equipment.

Secondly, if the random access is failed, the user equipment is required to re-initiate random access in a preset mode, for example, to re-initiate random access based on the 4 actions of initiating random access in the related art.

Thirdly, if the random access is failed, the user equipment needs to perform a preset action, such as transmitting a request to the base station to obtain a system message, or immediately retransmitting the preamble and the identity to the base station to re-initiate random access.

Fourthly, if the random access is failed, the user equipment needs to wait for a period of time before re-initiating random access.

With respect to the foregoing four types of results, the base station may generate the message corresponding to the results, and the message may include at least one information unit, and different information units are configured to indicate different results of the user equipment initiating random access.

It should be noted that the base station transmits the message by broadcasting, and the message may be scrambled by a preset scrambling mode, so that when one or more user equipment receives the message, only the user equipment that descrambles the message through a preset descrambling mode (corresponding to the preset scrambling mode), may obtain the content indicated by the information unit included in the message.

In addition, the information unit may include indication information and identification information of the user equipment. The indication information indicates the result of initiating random access through the user equipment. The identification information of the user equipment indicates the user equipment corresponding to the indication information in the same information unit as the identification information of the user equipment. The identification information may include the identity of the user equipment, and the identities (index numbers) of all preambles transmitted by the user equipment.

For example, the first information unit may include identification information of user equipment A and CR information. When both user equipment A and user equipment B descramble the message through the preset descrambling mode, the identification information and the CR information in the first information unit included in the message are obtained by user equipment A and user equipment B; then it is further determined which user equipment the CR information is for based on the identification information in the first information unit. Since the identification information is the identification information of user equipment A, user equipment A determines that the identification information matches its own identification information, and user equipment B determines that the identification information does not match its own identification information, so that user equipment A determines that the random access competition is successful, and user equipment B determine that the random access competition is failed.

After receiving the message transmitted by the base station, the user equipment may determine the result of random access based on the content indicated by the information unit included in the message, and then perform the operation corresponding to the result. For example, in a case of successful random access, the communication connection between the user equipment and the base station is established. In a case that random access needs to be re-initiated in a preset mode, the random access is re-initiated in the preset mode. In a case that a preset action needs to be executed, the preset action is executed. In a case that the random access is re-initiated after a period of time, the random access is re-initiated after the period of time.

According to embodiments of the disclosure, when the user equipment integrates the preamble and the identity into one message and transmits the message to the base station to initiate random access, the base station generates different information units to indicate different results of initiating random access through the user equipment and transmit at least one information unit as a message to the user equipment, so that one or more user equipment may determine the result of initiating random access based on the received message, and perform the operation corresponding to the result. Therefore, the user equipment and the base station may each transmit one message to the other to complete the random access process, which effectively reduces the duration of the random access process, and helps reduce the communication delay between the user equipment and the base station.

Optionally, the message includes a first information unit, and/or a second information unit, and/or a third information unit, and/or a fourth information unit.

The first information unit is configured to indicate whether the user equipment has succeeded in random access, the second information unit is configured to indicate whether the user equipment re-initiates random access in a preset mode, the third information unit is configured to indicate whether the user equipment performs a preset action, and the fourth information unit is configured to indicate a backoff duration of the user equipment.

In some embodiments, there may be multiple results of random access, and the base station generates the corresponding information unit for each type of results of random access. For example, for 4 types of results of random access, the base station generates the first information unit to indicate that the user equipment has succeeded in random access, the second information unit to indicate that the user equipment re-initiates random access in the preset mode, the third information unit to indicate that the user equipment performs the preset action, and the fourth information unit to indicate the backoff duration of the user equipment.

It should be noted that the message may include one or more information unit of the above 4 information units.

When the message includes one information unit of the above four information units, the user equipment may determine the result of random access based on the information unit. When the message includes multiple information units of the above 4 information units, the user equipment queries the information units based on priorities, and determines the result of random access based on the information unit with the highest priority. When the information unit includes the identification information of the user equipment, the user equipment may also determine the result of random access based on the information unit including the same identification information as its own identification information in the multiple information units.

Optionally, the first information unit includes a preamble identity (RAPID, Random Access Preamble Identifier) and CR information.

In some embodiments, the first information unit may include the preamble identity and CR information, and the user equipment may determine whether the preamble identity in the first information unit is the same as the preamble identity transmitted by itself. If the preamble identity in the first information unit is the same as the preamble identity transmitted by itself, it is determined that the CR information is for itself, and it is further determined that the random access competition is successful, and the communication connection between the user equipment and the base station is established.

Optionally, the second information unit includes a preamble identity and indication information, and the indication information is configured to indicate the preset mode.

In some embodiments, the second information unit may include the preamble identity and the indication information. The user equipment may determine whether the preamble identity in the second information unit is the same as the preamble identity transmitted by itself. If the preamble identity in the second information unit is the same as the preamble identity transmitted by itself, it is determined that the indication information is for itself, and random access is re-initiated in the preset mode, for example, random access is re-initiated based on the 4 actions of initiating random access in the related art.

The indication information may be a random access response, which may include time adjustment information of uplink synchronization, and uplink resource information.

Optionally, the third information unit includes a preamble identity only.

In some embodiments, the third information unit may only include the preamble identity, and the user equipment may determine whether the preamble identity in the third information unit is the same as the preamble identity transmitted by itself. If the preamble identity in the third information unit is the same as the preamble identity transmitted by itself, there is no other content in the information unit except the preamble identity, and the preset action may be performed, such as transmitting a request to the base station to obtain a system message, or immediately retransmitting the preamble and the identity to the base station to re-initiate random access.

The preset action includes but is not limited to the above two cases, which may be set as required.

Optionally, the fourth information unit only includes a backoff indicator associated with the backoff duration.

In some embodiments, the fourth information unit may only include the backoff indicator, and the user equipment may re-transmit the preamble and the identity to the base station based on the backoff indicator to re-initiate the random access. The backoff indicator may be a value associated with the back-off duration, and the user equipment may determine the back-off duration based on the backoff indicator, and the back-off duration is delayed before retransmitting the preamble and identity to the base station.

Figure 2:
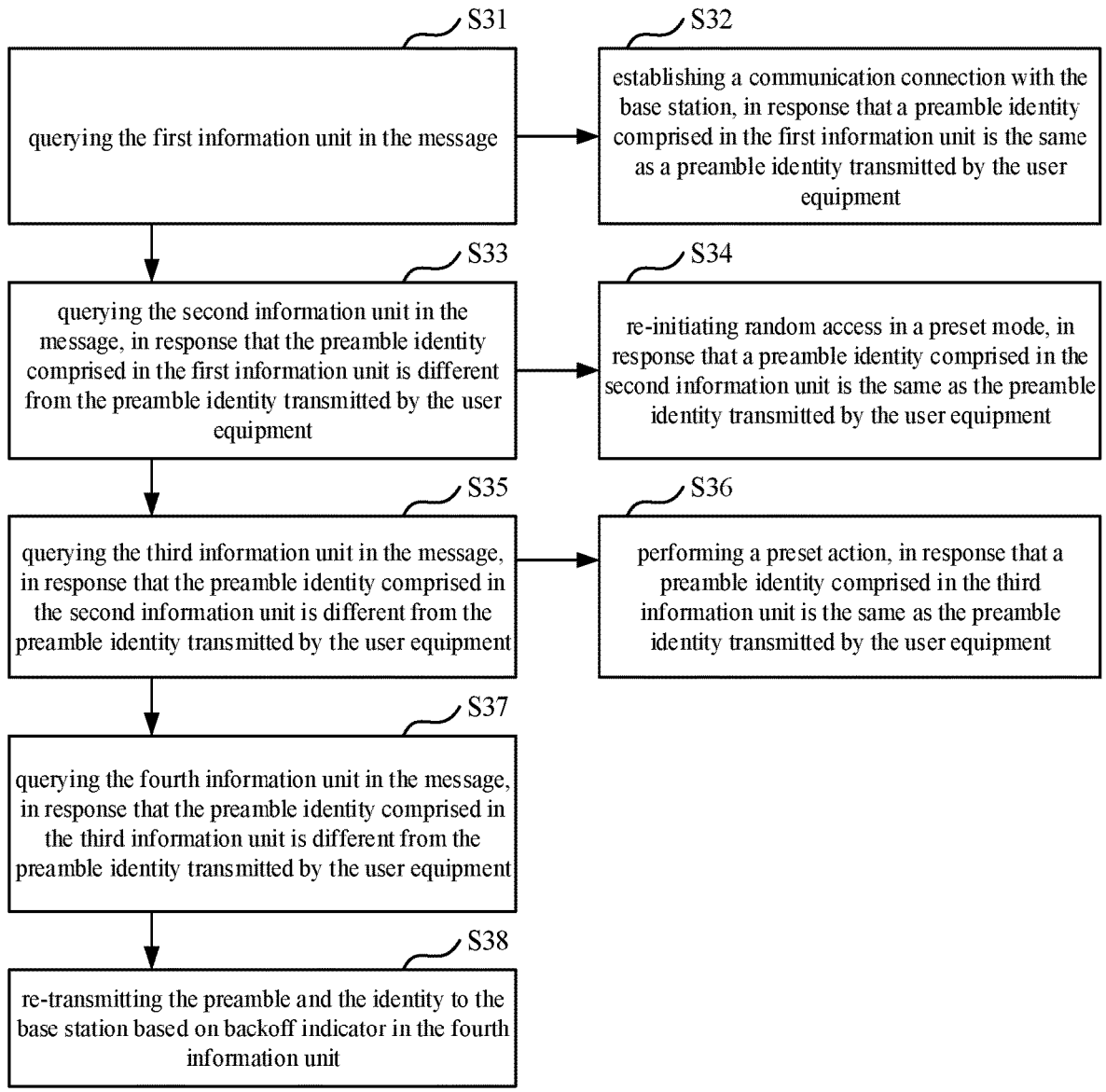
FIG. 2 is a flowchart of performing an operation corresponding to a result of initiating random access indicated by the information unit in the message according to embodiments of the disclosure.

FIG. 2 is a flowchart of performing an operation corresponding to a result of initiating random access indicated by the information unit in the message according to embodiments of the disclosure. As illustrated in FIG. 2, performing the operation corresponding to the result of initiating random access indicated by the information unit in the message includes the following.

In block S31, the first information unit in the message is queried.

In block S32, a communication connection between the user equipment and the base station is established, in response that the preamble identity included in the first information unit is the same as the preamble identity transmitted by the user equipment.

In some embodiments, since the first information unit is configured to indicate whether random access of the user equipment is succeeded, the user equipment determines whether the random access is successful based on the first information unit when the first information unit is queried. For example, it is determined whether the preamble identity in the first information unit is the same as the preamble identity transmitted by itself. If the preamble identity in the first information unit is the same as the preamble identity transmitted by itself, it is determined that the CR information is for itself, to determine that the random access competition is successful. Then, the communication connection between the user equipment and the base station is established and querying other information units is suspended.

Generally, when the base station indicates that random access of certain user equipment is succeeded, it may not indicate that the user equipment has failed random access at the same time. Therefore, once the user equipment determines that the random access is successful based on the first information unit, the communication connection between the user equipment and the base station is established. Only when it is determined based on the first information unit that the random access is failed, other information units are required to determine which operation to perform. Therefore, the user equipment is set to query the first information unit in the message after receiving the message transmitted by the base station, to determine whether the random access is successful based on the first information unit, so as to avoid the problem of delay in determining the success of random access when the user equipment first inquires other information units, when the base station indicates the success of the random access of the user equipment through the first information unit.

In block S33, the second information unit in the message is queried, in response that the preamble identity included in the first information unit is different from the preamble identity transmitted by the user equipment.

In block S34, random access is re-initiated in a preset mode, in response that the preamble identity included in the second information unit is the same as the preamble identity transmitted by the user equipment.

Further, if the preamble identity included in the first information unit that is queried is different from the preamble identity transmitted by the user equipment, the second information unit is queried first. Since the second information unit is configured to indicate whether the random access is re-initiated in the preset mode, the user equipment determines whether the random access is successful based on the second information unit when the second information unit is queried, for example, determines whether the preamble identity in the second information unit is the same as the preamble identity transmitted by itself. If the preamble identity in the second information unit is the same as the preamble identity transmitted by itself, it is determined that the indication information is for the user equipment, so that random access is re-initiated in the preset mode and querying other information units is suspended.

Generally, when the user equipment and the base station try to complete the random access process by transmitting one message to each other, and the random access is failed, the first information unit included in the message transmitted by the base station may not include the identity of the user equipment. In this case, if the base station still wants the user equipment to complete the random access, the base station transmits the second information unit including the identity of the user equipment in the message. When the preamble identity included in the first information unit queried is different from the preamble identity transmitted by the user equipment, the user equipment may first query the second information unit in the message. It is determined based on the second information unit whether to re-initiate the random access in the preset mode, so as to avoid the problem of delay in determining the success of random access when the user equipment first queries other information units but the base station instructs the user equipment to re-initiate the random access in the preset mode through the second information unit.

In block S35, the third information unit in the message is queried, in response that the preamble identity included in the second information unit is different from the preamble identity transmitted by the user equipment.

In block S36, a preset action is performed, in response that the preamble identity included in the third information unit is the same as the preamble identity transmitted by the user equipment.

Further, if the preamble identity included in the second information unit that is queried is different from the preamble identity transmitted by the user equipment, the third information unit may be queried first. Since the third information unit is configured to indicate whether the user equipment performs the preset action, the user equipment determines whether the random access is successful based on the third information unit when the third information unit is queried, for example, it is determined whether the preamble identity in the third information unit is the same as the preamble identity transmitted by itself. If the preamble identity in the third information unit is the same as the preamble identity transmitted by itself, the preset action is performed and querying on other information units is suspended.

Generally, when the user equipment and the base station try to complete the random access process by transmitting one message to each other, and the random access is failed, the base station wants the user equipment to be able to perform the preset action, so neither the first information unit nor the second information unit included in the message transmitted by the base station includes the identity of the user equipment. In this case, the user equipment is set to query the third information unit in the message first, to determine whether to perform the preset action based on the third information unit, to avoid the problem of delay in executing the preset action when the base station instructs the user equipment to perform the preset action through the second information unit but the user equipment first queries other information units.

In block S37, the fourth information unit in the message is queried, in response that the preamble identity included in the third information unit is different from the preamble identity transmitted by the user equipment.

In block S38, the preamble and the identity are re-transmitted to the base station based on the backoff indicator in the fourth information unit.

Further, if the preamble identity included in the queried third information unit is different from the preamble identity transmitted by the user equipment, the fourth information unit may continue to be queried, and the fourth information unit is generally carried in the message transmitted to the user equipment by the base station. For example, for certain user equipment, if the first information unit, the second information unit, and the third information unit in the message transmitted by the base station may not include the identity of the user equipment, the user equipment queries the fourth information unit. The preamble and the identity are re-transmitted to the base station based on the backoff indicator in the fourth information unit, for example, the back-off duration is determined based on the backoff indicator, and the back-off duration is delayed before re-transmitting the preamble and the identity to the base station to initiate the random access.

Optionally, the first information unit, the second information unit, the third information unit, and the fourth information unit are subPDUs (sub protocol data units) of a MAC (Media Access Control) layer.

In some embodiments, the message transmitted by the base station may include a PDU (Protocol Data Unit), the protocol data unit may include multiple subPDUs, and may also include multiple paddings.

Figure 3:
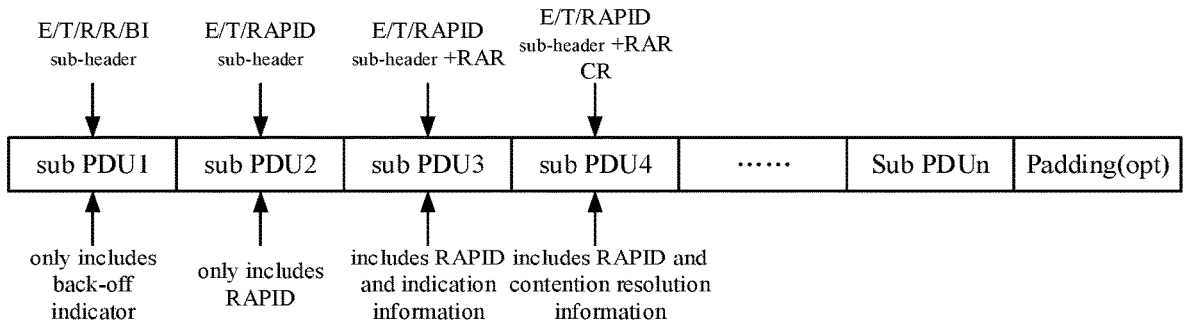
FIG. 3 is a block diagram of a protocol data unit according to embodiments of the disclosure.

FIG. 3 is a block diagram of a protocol data unit according to embodiments of the disclosure. As illustrated in FIG. 3, the PDU includes n subPDUs, and may include one optional padding.

In FIG. 3, subPDU1 is the foregoing fourth information unit, which only includes a BI (backoff indicator), and subPDU1 is used as an E/T/R/R/BI sub-header.

subPDU2 is the aforementioned third information unit, which only includes RAPID (i.e., the preamble identity), and subPDU2 is used as the E/T/RAPID sub-header.

subPDU3 is the above-mentioned second information unit, which includes RAPID and indication information, the indication information may be RAR, and subPDU3 may be used as the E/T/RAPID sub-header and RAR.

subPDU4 is the above-mentioned first information unit, which includes RAPID and CR information, and subPDU4 may be used as E/T/RAPID sub-header and RAR CR.

It should be noted that the subPDUs corresponding to the four information units in the protocol data unit are not limited to the situation in FIG. 3, which may be adjusted as needed.

In some embodiments, the four information units may be set in the preset sub protocol data units, so that after the user equipment receives the message transmitted by the base station, the sub protocol data unit including the first information unit, the sub protocol unit including the second information unit, the sub protocol unit including the third information unit, and the sub protocol unit including the fourth information unit are queried sequentially.

In this case, it is possible to make the user equipment preferentially query the first information unit and determine whether random access is successful based on the first information unit. The second information unit may firstly be queried when the preamble identity included in the first information unit is different from the preamble identity transmitted by the user equipment, and it is determined whether to re-initiate random access in the preset mode based on the second information unit. The third information unit is firstly queried when the preamble identity included in the second information unit is different from the preamble identity transmitted by the user equipment, and it is determined whether to perform the preset action based on the third information unit. When the preamble identity included in the third information unit is different from the preamble identity transmitted by the user equipment, the fourth information unit is queried last.

Figure 4:
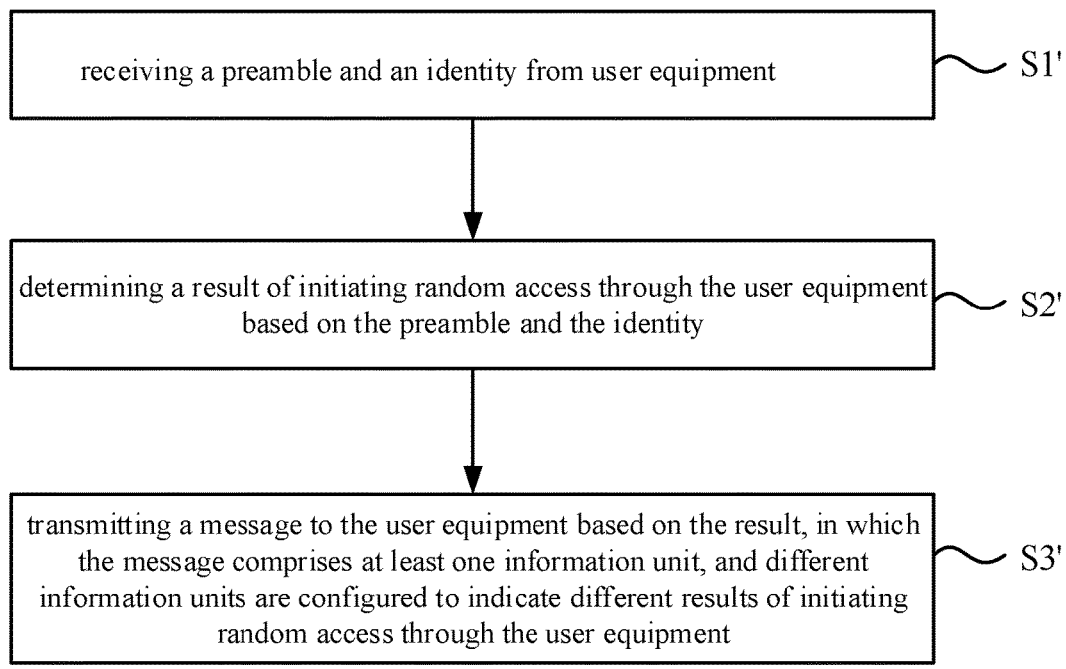
FIG. 4 is a flowchart of a random access method according to embodiments of the disclosure.

FIG. 4 is a flowchart of a random access method according to embodiments of the disclosure. The random access method in the embodiments of the disclosure is applicable to the base station. The base station communicates with the user equipment, for example, the base station communicates with the user equipment based on 4G or 5G technologies. The user equipment may be a mobile phone, a tablet computer, wearable devices and other electronic devices.

As illustrated in FIG. 4, the random access method includes the following.

In block S1', a preamble and an identity transmitted by user equipment are received.

In block S2', a result of initiating random access through the user equipment is determined based on the preamble and the identity.

In block S3', a message is transmitted to the user equipment based on the result, in which the message includes at least one information unit, and different information units are configured to indicate different results of initiating random access through the user equipment.

According to embodiments of the disclosure, when the user equipment integrates the preamble and the identity into one message and transmits the message to the base station to initiate random access, the base station generates different information units to indicate different results of initiating random access through the user equipment and transmit at least one information unit as a message to the user equipment, so that one or more user equipment may determine the result of initiating random access based on the received message, and perform the operation corresponding to the result. Therefore, the user equipment and the base station may each transmit one message to the other to complete the random access process, which effectively reduces the duration of the random access process, and helps reduce the communication delay between the user equipment and the base station.

In some embodiments, the user equipment may integrate MSG1 and MSG3 into message X and transmit message X to the base station. Message X includes the preamble for random access and the identity of the user equipment. The base station may receive all of message X, that is, MSG1 and MSG3 are received, or receive only part of message X, for example, only MSG1 may be received, or may not receive message X. In these cases, the results of random access determined by the base station may be different or partly the same.

For example, when the base station receives MSG1 and MSG3, the first information unit may be transmitted to indicate that the user equipment has succeeded in random access. For example, if the base station only receives MSG1, the second information unit may be transmitted to instruct the user equipment to re-initiate random access in the preset mode, or the third information unit may be transmitted to instruct the user equipment to perform the preset action. If the base station does not receive MSG1 or MSG3, the fourth information unit may be transmitted to indicate the user equipment's back-off duration.

Optionally, the message includes a first information unit, and/or a second information unit, and/or a third information unit, and/or a fourth information unit.

The first information unit is configured to indicate whether the user equipment has succeeded in random access, the second information unit is configured to indicate whether the user equipment re-initiates random access in a preset mode, the third information unit is configured to indicate whether the user equipment performs a preset action, and the fourth information unit is configured to indicate a backoff duration of the user equipment.

In some embodiments, there may be multiple results of random access, and the base station generates the corresponding information unit for each type of results of random access. For example, for 4 types of results of random access, the base station generates the first information unit to indicate that the user equipment has succeeded in random access, the second information unit to indicate that the user equipment re-initiates random access in the preset mode, the third information unit to indicate that the user equipment performs the preset action, and the fourth information unit to indicate the backoff duration of the user equipment.

It should be noted that the message may include one or more information unit of the above 4 information units.

When the message includes one information unit of the above four information units, the user equipment may determine the result of random access based on the information unit. When the message includes multiple information units of the above 4 information units, the user equipment queries the information units based on priorities, and determines the result of random access based on the information unit with the highest priority. When the information unit includes the identification information of the user equipment, the user equipment may also determine the result of random access based on the information unit including the same identification information as its own identification information in the multiple information units.

Optionally, the first information unit includes a preamble identity and CR information.

In some embodiments, the first information unit may include the preamble identity and CR information, and the user equipment may determine whether the preamble identity in the first information unit is the same as the preamble identity transmitted by itself. If the preamble identity in the first information unit is the same as the preamble identity transmitted by itself, it is determined that the CR information is for itself, and it is further determined that the random access competition is successful, and the communication connection between the user equipment and the base station is established.

Optionally, the second information unit includes a preamble identity and indication information, and the indication information is configured to indicate the preset mode.

In some embodiments, the second information unit may include the preamble identity and the indication information. The user equipment may determine whether the preamble identity in the second information unit is the same as the preamble identity transmitted by itself. If the preamble identity in the second information unit is the same as the preamble identity transmitted by itself, it is determined that the indication information is for itself, and random access is re-initiated in the preset mode, for example, random access is re-initiated based on the 4 actions of initiating random access in the related art.

The indication information may be a random access response, which may include time adjustment information of uplink synchronization, and uplink resource information.

Optionally, the third information unit includes a preamble identity only.

In some embodiments, the third information unit may only include the preamble identity, and the user equipment may determine whether the preamble identity in the third information unit is the same as the preamble identity transmitted by itself. If the preamble identity in the third information unit is the same as the preamble identity transmitted by itself, there is no other content in the information unit except the preamble identity, and the preset action may be performed, such as transmitting a request to the base station to obtain a system message, or immediately retransmitting the preamble and the identity to the base station to re-initiate random access.

The preset action includes but is not limited to the above two cases, and may be set as required.

Optionally, the fourth information unit only includes a backoff indicator associated with the backoff duration.

In some embodiments, the fourth information unit may only include the backoff indicator, and the user equipment may re-transmit the preamble and the identity to the base station based on the backoff indicator to re-initiate the random access. The backoff indicator may be a value associated with the back-off duration, and the user equipment may determine the back-off duration based on the backoff indicator, and the back-off duration is delayed before retransmitting the preamble and identity to the base station.

Optionally, the first information unit, the second information unit, the third information unit, and the fourth information unit are sub protocol data units of a MAC layer.

Corresponding to the above embodiments of the random access method, the disclosure also provides embodiments of a random access apparatus.

Figure 5:
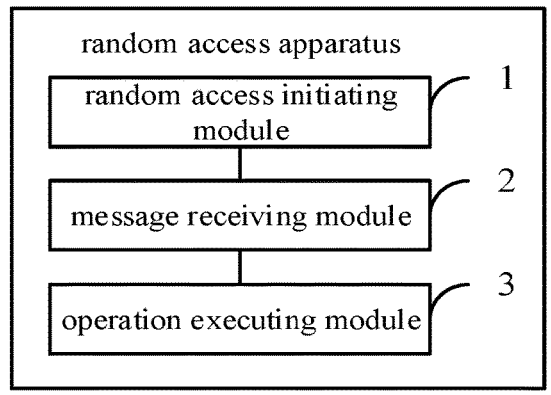
FIG. 5 is a block diagram of a random access apparatus according to embodiments of the disclosure.

FIG. 5 is a block diagram illustrating a random access apparatus according to embodiments of the disclosure. The random access apparatus described in the embodiments of the disclosure is applicable to user equipment. The user equipment may communicate with a base station, for example may communicate with the base station based on 4G or 5G technologies. The user equipment may be a mobile phone, a tablet computer, a wearable device and other electronic devices.

As illustrated in FIG. 5, the random access apparatus includes: a random access initiating module 1, a message receiving module 2 and an operation executing module 3.

The random access initiating module 1 is configured to initiate random access by transmitting a preamble and an identity to a base station.

The message receiving module 2 is configured to receive a message fed back by the base station for the preamble and the identity. The message includes at least one information unit, and different information units are configured to indicate different results of initiating random access through the user equipment.

The operation executing module 3 is configured to perform an operation corresponding to a result of initiating random access indicated by the information unit in the message.

Optionally, the message includes a first information unit, and/or a second information unit, and/or a third information unit, and/or a fourth information unit.

The first information unit is configured to indicate whether the user equipment has succeeded in random access, the second information unit is configured to indicate whether the user equipment re-initiates random access in a preset mode, the third information unit is configured to indicate whether the user equipment performs a preset action, and the fourth information unit is configured to indicate a backoff duration of the user equipment.

Optionally, the first information unit includes a preamble identity and CR information.

Optionally, the second information unit includes a preamble identity and indication information, and the indication information is configured to indicate the preset mode.

Optionally, the third information unit includes a preamble identity only.

Optionally, the fourth information unit includes a backoff indicator only, and the backoff indicator is associated with the backoff duration.

Figure 6:
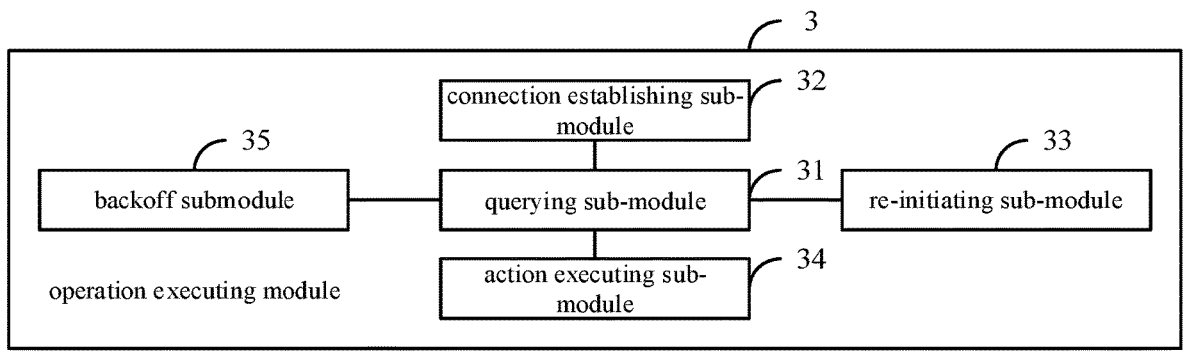
FIG. 6 is a block diagram of an operation executing module according to embodiments of the disclosure.

FIG. 6 is a block diagram illustrating an operation executing module according to embodiments of the disclosure. As illustrated in FIG. 6, the operation executing module 3 includes: a querying sub-module 31, a connection establishing sub-module 32, a re-initiating sub-module 33, an action executing sub-module 34 and a backoff submodule 35.

The querying sub-module 31 is configured to query the first information unit in the message; to query the second information unit in the message, in response that a preamble identity included in the first information unit is different from a preamble identity transmitted by the user equipment; to query the third information unit in the message, in response that a preamble identity included in the second information unit is different from the preamble identity transmitted by the user equipment; and to query the fourth information unit in the message, in response that a preamble identity included in the third information unit is different from the preamble identity transmitted by the user equipment.

The connection establishing sub-module 32 is configured to establish a communication connection with the base station, in response that the preamble identity included in the first information unit is the same as the preamble identity transmitted by the user equipment.

The re-initiating sub-module 33 is configured to re-initiate random access in a preset mode, in response that the preamble identity included in the second information unit is the same as the preamble identity transmitted by the user equipment.

The step executing sub-module 34 is configured to perform a preset action, in response that the preamble identity included in the third information unit is the same as the preamble identity transmitted by the user equipment.

The backoff submodule 35 is configured to re-transmit the preamble and the identity to the base station based on backoff indicator in the fourth information unit.

Optionally, the first information unit, the second information unit, the third information unit, and the fourth information unit are sub protocol data units of a MAC layer.

Figure 7:
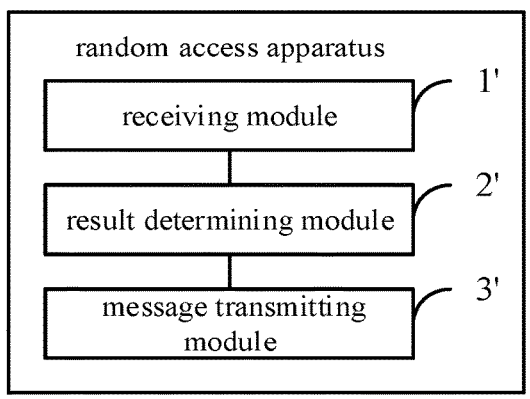
FIG. 7 is a block diagram of a random access apparatus according to embodiments of the disclosure.

FIG. 7 is a block diagram illustrating a random access apparatus according to embodiments of the disclosure. The random access apparatus in the embodiments of the disclosure may be applicable to a base station. The base station may communicate with user equipment, for example, the base station may communicate with the user equipment based on 4G and 5G technologies. The user equipment may be a mobile phone, a tablet computer, wearable devices and other electronic devices.

As illustrated in FIG. 7, the random access apparatus includes: a receiving module 1', a result determining module 2' and a message transmitting module 3'.

The receiving module 1' is configured to receive a preamble and an identity transmitted by user equipment.

The result determining module 2' is configured to determine a result of initiating random access through the user equipment based on the preamble and the identity.

The message transmitting module 3' is configured to transmit a message to the user equipment based on the result. The message includes at least one information unit, and different information units are configured to indicate different results of initiating random access through the user equipment.

Optionally, the message includes a first information unit, and/or a second information unit, and/or a third information unit, and/or a fourth information unit.

The first information unit is configured to indicate whether the user equipment has succeeded in random access, the second information unit is configured to indicate whether the user equipment re-initiates random access in a preset mode, the third information unit is configured to indicate whether the user equipment performs a preset action, and the fourth information unit is configured to indicate a backoff duration of the user equipment.

Optionally, the first information unit includes a preamble identity and CR information.

Optionally, the second information unit includes a preamble identity and indication information, and the indication information is configured to indicate the preset mode.

Optionally, the third information unit includes a preamble identity only.

Optionally, the fourth information unit only includes a backoff indicator, and the backoff indicator is associated with the backoff duration.

Optionally, the first information unit, the second information unit, the third information unit, and the fourth information unit are sub protocol data units of a MAC layer.

Regarding the apparatus in the above embodiments, the specific manner in which each module performs operations has been described in detail in the embodiments of the related method, which will not be repeated herein.

With respect to the apparatus embodiments, since they basically correspond to the method embodiments, relevant parts of the apparatus embodiments may refer to parts of the description of the method embodiments. The apparatus embodiments described above are merely illustrative. The units described above as separate components may or may not be physically separated, and the components displayed as units may or may not be physical units, that is, they may be located in one place or distributed to multiple network units. Some or all of the modules may be selected based on actual needs to achieve the objectives of the solutions of the disclosure. Those of ordinary skill in the art may understand and implement it without creative work.

The embodiments of the disclosure provide an electronic device.

The electronic device includes a processor.

The electronic device further includes a memory for storing instructions executable by the processor.

The processor is configured to perform the method described in any of the above embodiments.

The embodiments of the disclosure also provide a computer-readable storage medium on which a computer program is stored, and when the program is executed by a processor, the actions in the method described in any of the above embodiments are performed.

Figure 8:
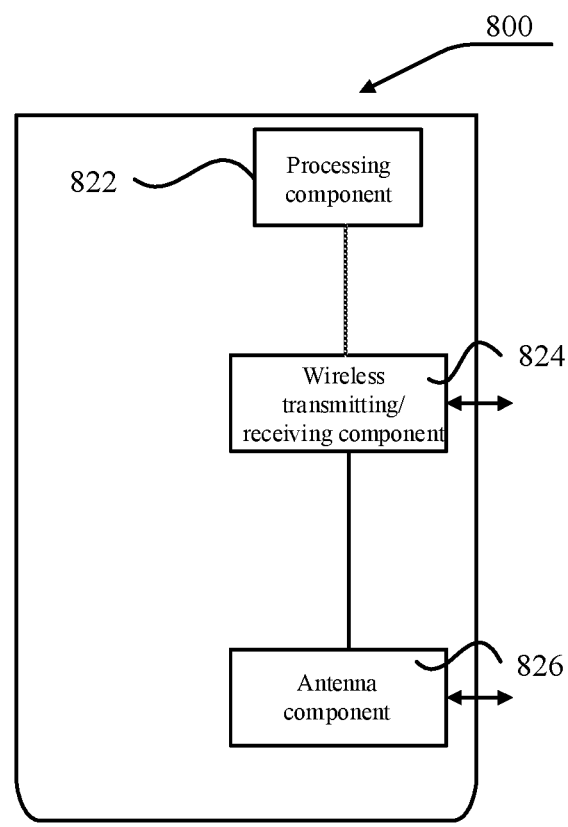
FIG. 8 is a block diagram of a random access device according to embodiments of the disclosure.

As illustrated in FIG. 8, FIG. 8 is a block diagram illustrating a random access device 800 according to embodiments of the disclosure. The device 800 may be provided as a base station. With reference to FIG. 8, the device 800 includes a processing component 822, a wireless transmitting/receiving component 824, an antenna component 826, and a signal processing portion specific to a wireless interface. The processing component 822 may further include one or more processors. One of the processors in the processing component 822 may be configured to perform the method in the embodiments in FIG. 4.

Figure 9:
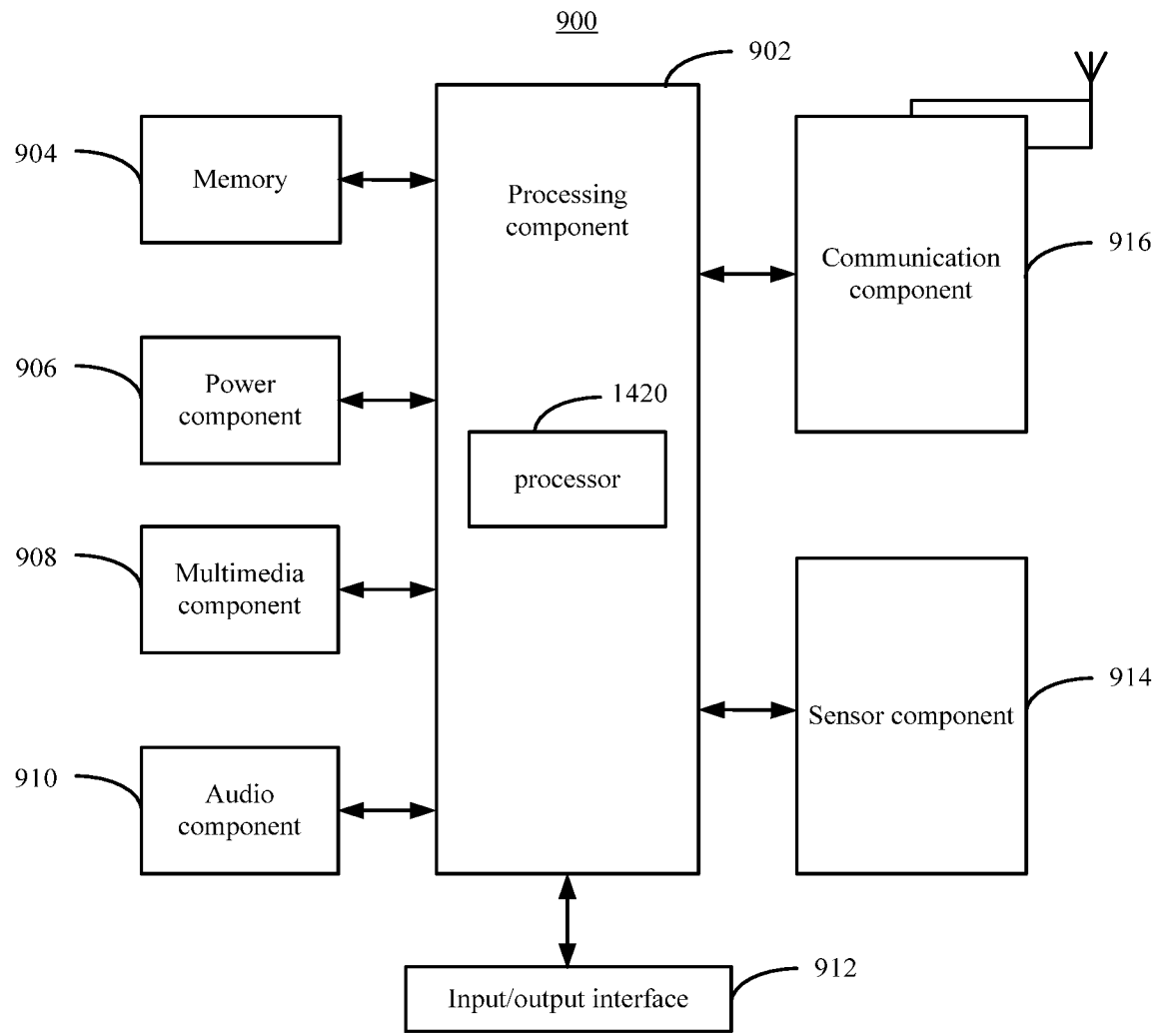
FIG. 9 is a block diagram of a random access device according to embodiments of the disclosure.

FIG. 9 is a block diagram illustrating a random access device 900 according to embodiments of the disclosure. For example, the device 900 may be a mobile phone, a computer, a digital broadcasting terminal, a messaging device, a gaming console, a tablet, a medical device, exercise equipment, a personal digital assistant, and the like.

As illustrated in FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the actions in the above described method illustrated in FIG. 1. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the device 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as Wi-Fi, 2G (2nd-Generation Mobile Communication Technology), or 3G (3rd-Generation Mobile Communication Technology), 4G LTE (Long Term Evolution), 5G NR (New Radio) or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method illustrated in FIG. 1.

In exemplary embodiments, there is also provided a non-transitory computer readable storage medium including instructions, such as included in the memory 904, executable by the processor 920 in the device 900, for performing the above method. For example, the non-transitory computer-readable storage medium may be a ROM, a RAM, a CD-ROM, a magnetic tape, a floppy disc, an optical data storage device, and the like.

Those skilled in the art easily think of other embodiments of the disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . ." does not exclude the presence of additional identical elements in the process, method, article or device that comprises the said element.

The method and apparatus provided by the embodiments of the disclosure are described in detail. Specific examples are used herein to illustrate the principles and implementations of the disclosure. The description of the above embodiments is only used to help understand the method and its core idea of the disclosure. Meanwhile, for those skilled in the art, according to the idea of the disclosure, there will be changes in the specific implementation and the scope of the disclosure. In conclusion, the content of the disclosure should not be construed as reference limitation of the disclosure.

What is claimed is:

1. A random access method, performed by a user equipment (UE), comprising:
   initiating random access by transmitting a preamble and an identity to a base station;
   receiving a message fed back by the base station for the preamble and the identity, wherein the message comprises at least one of: a first information unit, a second information unit, a third information unit or a fourth information unit, the first information unit is configured to indicate whether the user equipment has succeeded in random access, the second information unit is configured to indicate whether the user equipment re-initiates random access based on 4 actions of initiating random access, the third information unit is configured to indicate whether the user equipment performs a preset action, and the fourth information unit is configured to indicate a backoff duration of the user equipment; and performing an operation corresponding to a result of initiating random access indicated by the information unit in the message;
wherein performing the operation corresponding to the result of initiating random access indicated by the information unit in the message comprises:
querying the first information unit in the message;
establishing a communication connection with the base station, in response that a preamble identity comprised in the first information unit is the same as a preamble identity transmitted by the user equipment;
querying the second information unit in the message, in response that the preamble identity comprised in the first information unit is different from the preamble identity transmitted by the user equipment;
re-initiating random access in a preset mode, in response that a preamble identity comprised in the second information unit is the same as the preamble identity transmitted by the user equipment;
querying the third information unit in the message, in response that the preamble identity comprised in the second information unit is different from the preamble identity transmitted by the user equipment;
performing a preset action, in response that a preamble identity comprised in the third information unit is the same as the preamble identity transmitted by the user equipment;
querying the fourth information unit in the message, in response that the preamble identity comprised in the third information unit is different from the preamble identity transmitted by the user equipment; and
re-transmitting the preamble and the identity to the base station based on backoff indicator in the fourth information unit.

2. The method as claimed in claim 1, wherein the first information unit comprises a preamble identity and contention resolution information.

3. The method as claimed in claim 1, wherein the second information unit comprises a preamble identity and indication information, and the indication information is configured to indicate the user equipment to re-initiate the random access based on the 4 actions of initiating random access.

4. The method as claimed in claim 1, wherein the third information unit comprises a preamble identity only.

5. The method as claimed in claim 1, wherein the fourth information unit comprises a backoff indicator only, and the backoff indicator is associated with the backoff duration.

6. The method as claimed in claim 1, wherein the first information unit, the second information unit, the third information unit, and the fourth information unit are subPDUs (sub protocol data units) of a MAC (Media Access Control) layer.

7. A random access method, performed by a base station, comprising:
receiving a preamble and an identity from user equipment (UE);
determining a result of initiating random access by the user equipment based on the preamble and the identity; and
transmitting a message to the user equipment based on the result, wherein the message comprises at least one of: a first information unit, a second information unit, a third information unit or a fourth information unit, the first information unit is configured to indicate whether the user equipment has succeeded in random access, the second information unit is configured to indicate whether the user equipment re-initiates random access based on 4 actions of initiating random access, the third information unit is configured to indicate whether the user equipment performs a preset action, and the fourth information unit is configured to indicate a backoff duration of the user equipment, such that the UE performs the actions of:
querying the first information unit in the message;
establishing a communication connection with the base station, in response that a preamble identity comprised in the first information unit is the same as a preamble identity transmitted by the user equipment;
querying the second information unit in the message, in response that the preamble identity comprised in the first information unit is different from the preamble identity transmitted by the user equipment;
re-initiating random access in a preset mode, in response that a preamble identity comprised in the second information unit is the same as the preamble identity transmitted by the user equipment;
querying the third information unit in the message, in response that the preamble identity comprised in the second information unit is different from the preamble identity transmitted by the user equipment;
performing a preset action, in response that a preamble identity comprised in the third information unit is the same as the preamble identity transmitted by the user equipment;
querying the fourth information unit in the message, in response that the preamble identity comprised in the third information unit is different from the preamble identity transmitted by the user equipment; and
re-transmitting the preamble and the identity to the base station based on backoff indicator in the fourth information unit.

8. The method as claimed in claim 7, wherein the first information unit comprises a preamble identity and contention resolution information.

9. The method as claimed in claim 7, wherein the second information unit comprises a preamble identity and indication information, and the indication information is configured to indicate the user equipment to re-initiate the random access based on the 4 actions of initiating random access.

10. The method as claimed in claim 7, wherein the third information unit comprises a preamble identity only.

11. The method as claimed in claim 7, wherein the fourth information unit comprises a backoff indicator only, and the backoff indicator is associated with the backoff duration.

12. The method as claimed in claim 7, wherein the first information unit, the second information unit, the third information unit, and the fourth information unit are subPDUs (sub protocol data units) of a MAC (Media Access Control) layer.

13. A communication device, comprising:
a processor;
a memory for storing instructions executable by the processor; wherein,
the processor is configured to:
initiate random access by transmitting a preamble and an identity to a base station;
receive a message fed back by the base station for the preamble and the identity, wherein the message comprises at least one of: a first information unit, a second information unit, a third information unit or a fourth information unit, the first information unit is configured to indicate whether the user equipment has succeeded in random access, the second information unit is configured to indicate whether the user equipment re-initiates random access based on 4 actions of initiating random access, the third information unit is configured to indicate whether the user equipment performs a preset action, and the fourth information unit is configured to indicate a backoff duration of the user equipment; and perform an operation corresponding to a result of initiating random access indicated by the information unit in the message;

wherein the processor is further configured to:

query the first information unit in the message;

establish a communication connection with the base station, in response that a preamble identity comprised in the first information unit is the same as a preamble identity transmitted by the user equipment;

query the second information unit in the message, in response that the preamble identity comprised in the first information unit is different from the preamble identity transmitted by the user equipment;

re-initiate random access in a preset mode, in response that a preamble identity comprised in the second information unit is the same as the preamble identity transmitted by the user equipment;

query the third information unit in the message, in response that the preamble identity comprised in the second information unit is different from the preamble identity transmitted by the user equipment;

perform a preset action, in response that a preamble identity comprised in the third information unit is the same as the preamble identity transmitted by the user equipment;

query the fourth information unit in the message, in response that the preamble identity comprised in the third information unit is different from the preamble identity transmitted by the user equipment; and re-transmit the preamble and the identity to the base station based on backoff indicator in the fourth information unit.

* * * * *